Oct. 15, 1957  C. L. KENNEDY  2,809,678
CARRIAGE FEED MECHANISM FOR MACHINE TOOLS
Filed Oct. 13, 1954  4 Sheets-Sheet 1

INVENTOR.
CHARLES L. KENNEDY
BY
Henry H. Snelling
ATTORNEY

Oct. 15, 1957      C. L. KENNEDY      2,809,678
CARRIAGE FEED MECHANISM FOR MACHINE TOOLS
Filed Oct. 13, 1954      4 Sheets-Sheet 2
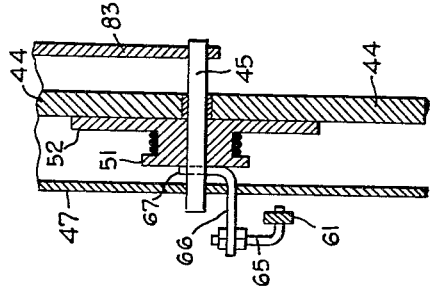
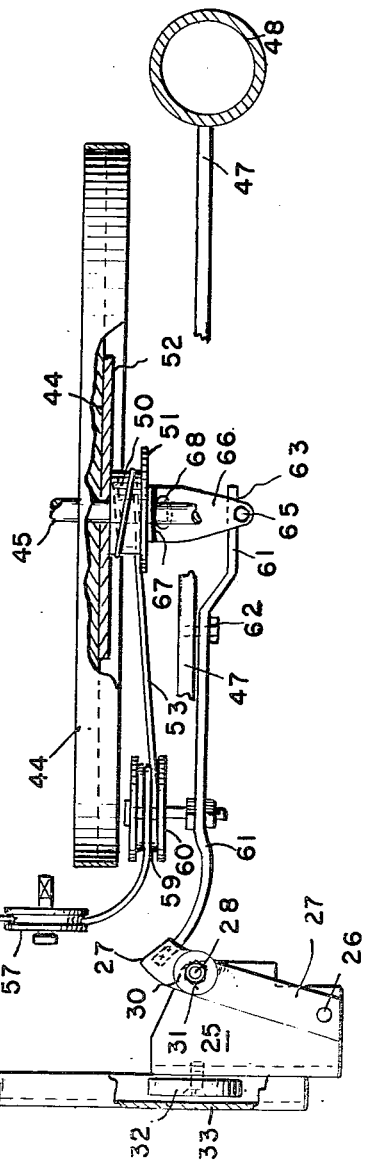
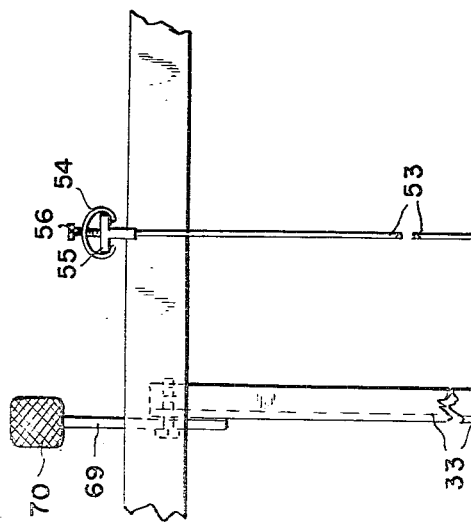
INVENTOR.
CHARLES L. KENNEDY
Henry H. Snelling
ATTORNEY

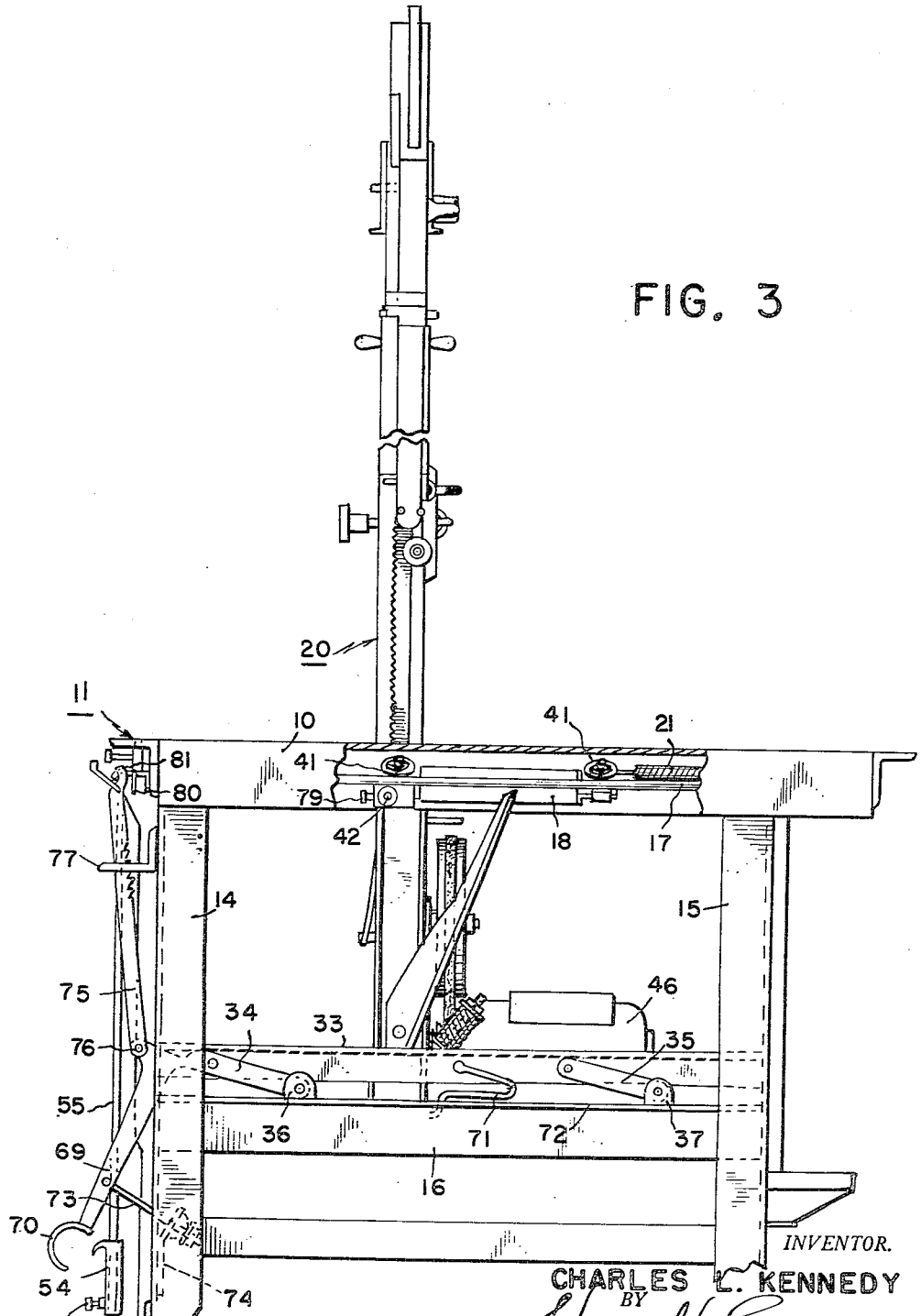

Oct. 15, 1957     C. L. KENNEDY     2,809,678
CARRIAGE FEED MECHANISM FOR MACHINE TOOLS
Filed Oct. 13, 1954     4 Sheets—Sheet 4

INVENTOR.
CHARLES L. KENNEDY
BY Henry H. Snelling
ATTORNEY

United States Patent Office 2,809,678
Patented Oct. 15, 1957

2,809,678

CARRIAGE FEED MECHANISM FOR MACHINE TOOLS

Charles L. Kennedy, Columbia, S. C.

Application October 13, 1954, Serial No. 461,950

13 Claims. (Cl. 143—17)

This invention relates to machine tools of the type in which a movable support rolls or slides in or on a frame or other supporting structure and has for its principal object the provision of a feed mechanism which will cause the movable support such as a carriage to travel at a rate governed by the resistance of the work to the tool carried by the carriage.

An object of the invention is to provide a fairly simple feed mechanism suitable for moving a carriage on which a band saw is mounted in which the rate of travel may be governed either automatically or by a mechanism directly controlled manually, as by a foot pedal, the rate of feed in either case slowing from normal in case of increasing resistance to the cutting by the saw blade.

A further object of the invention is to provide a feed arrangement for machine tools in which a movable support is caused to travel by winding a cable on a drum by clutch means, the drum being on the moving support and the end of the cable being fastened to the frame or body upon which the support is mounted, this object also including the provision of means to vary the degree of clutching in a resilient manner so that as soon as the cause of excess slippage of the clutch is removed normal travel of the support and the tool carried thereby may be resumed.

In the drawings:

Figure 2 is a simplified plan;

Figure 3 is a side elevation partly broken away;

Figure 5 is a section taken on the axis of the stationary shaft at right angles to both Figure 1 and Figure 2.

Figure 1:
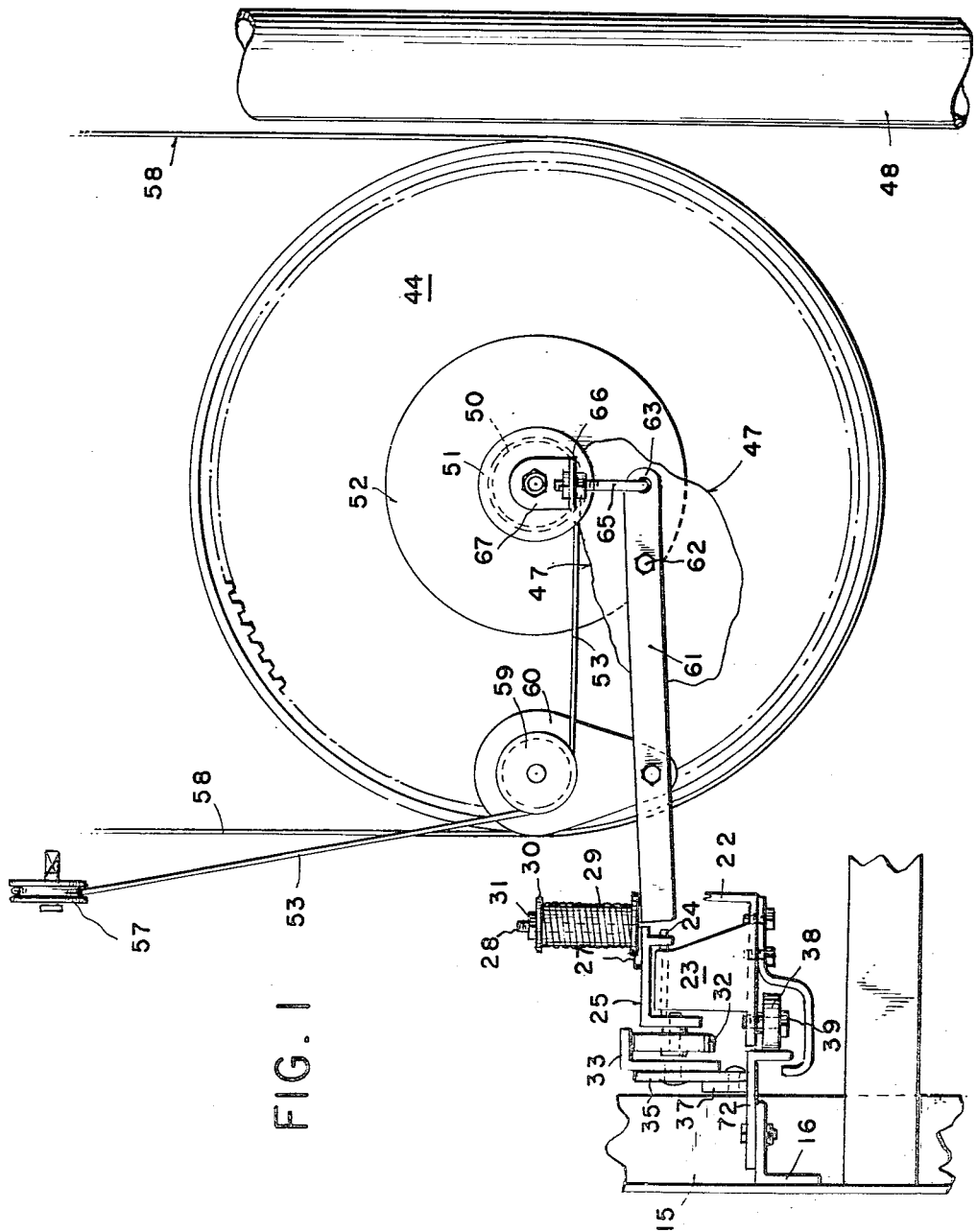
Figure 1 is a fragmentary rear view.

Referring first to Fig. 3 for a general view of the machine tool chosen as a typical embodiment of the invention, here shown as a band saw, the supporting structure or stand includes a table 10, a front end plate 11, legs 14 and 15 at the right of the stand, these being joined by a unit of channel 16. The table 10 carries a round rod track 17 upon which a carriage 18 rolls forward as governed by the feed mechanism of the present invention, moving the band saw assembly 20 in the working direction, i. e., toward the front of the table. Return movement may be had by hand but the carriage return is preferably by means of a spring 21, one end being secured to the carriage and the other end to the rear portion of the stand or table.

Figure 4:
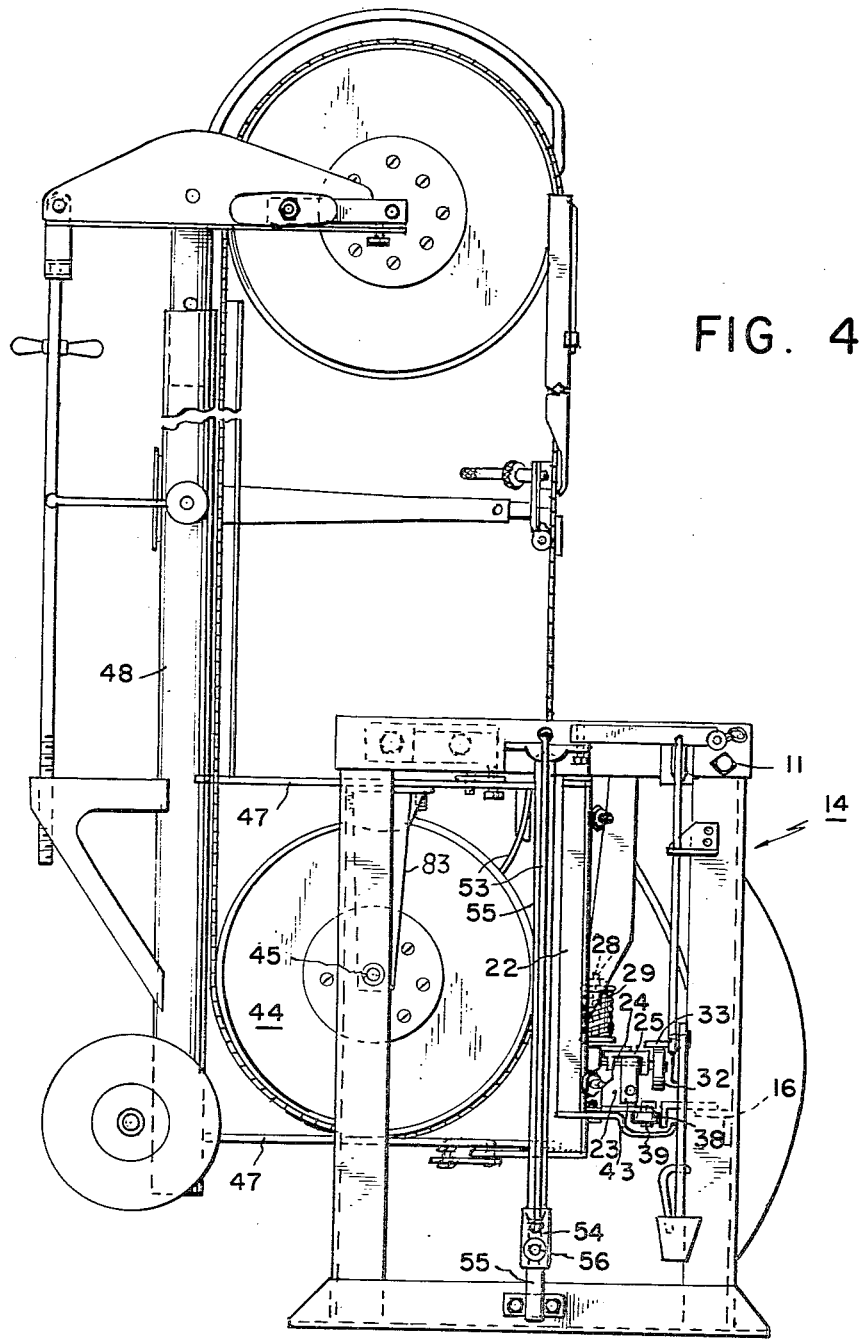
Figure 4 is a front view.

The vertical angle bar 22 (Fig. 1) fast to the carriage 18 has a bottom bracket 23 on which is mounted by means of a horizontal pivot pin 24 a platform 25, the latter carrying loosely as at 26 (Fig. 2) a bar 27. A long threaded stud 28 fast to the platform and passing loosely through a hole in the bar adjustably carries the control or adjusting spring 29, the tension of which against both the bar and the platform is controlled by the setting of the washer 30 locked by nut 31. At its outer side a downturned flange of the platform 25 carries a roller 32 which engages the long angle iron 33 which is a parallel bar constantly held horizontal by links 34 and 35 pivoted to the bar and to lugs 36 and 37 (Fig. 3) secured to the channel member 16 formed by two angle irons bolted together the lower of which is a frame member as shown in Figs. 1 and 3. A leaf spring 43 (Fig. 4) holds the free end of the platform elevated so that the roller 32 follows the upward movement of the horizontal angle iron 33. A roller 38 turning about a vertical stud 39 on the saw support 22 cooperates with two grooved rollers 41 rolling on track 17 to support the band saw carriage. Roller 42 engages the bottom of the stationary track 17 to take care of the upward lift of the saw while cutting.

The bottom band wheel 44 (Figs. 2 and 4) on shaft 45 is driven by a motor 46 (Fig. 3) adjustably mounted at the rear of a heavy vertical plate 47 (Figs. 2 and 4) fast to the column 48 and bolted to the downwardly extending saw supporting angle iron 22 of the carriage, the band wheel itself being forward of this main saw supporting plate 47 to which shaft 45 is non-rotatably secured. The other end of shaft 45 is fast to the lower end of a strut 83 extending downwardly from the upper horizontal flange of plate 47.

Between the plate and the band wheel a drum 50 is loosely mounted on shaft 45, the drum having a rear flange 51 (Fig. 2) and a much larger flange 52 which is a roughened clutch plate resiliently held in contact with the rear surface of the band wheel 44 whereby, when the two members are held in contact, rotation of the band wheel tends to rotate the drum in the same direction, thus winding the cable 53 on the drum and consequently pulling the entire band saw assembly 20 forward in the cutting direction.

This band saw assembly is a separate unit including a long vertical hinge member (not shown) which is bolted to the vertical angle iron 22 rigid with the carriage which moves forward and backward on the track 17 and is supported by the two upper wheels 41, the wheel 42 engaging the bottom of the track and the wheels 32 and 38 at the bottom. By adjusting the saw guides illustrated in the usual manner, the saw assembly can be moved about its vertical hinge from the position shown in Figure 4 to one where the column 48 just clears the table.

The cable is anchored at its front end to a heavy slide 54 usually freely movable on a vertical guide 55 mounted at the front end of the machine but which may be locked in any chosen position by the hand set screw 56 which action limits the rearward movement of the saw and carriage, this being particularly useful when cutting off narrow pieces as it saves the time required to move the carriage to the rear and then have it come forward to the work. The weight of the slide 54 is such as to keep the cable taut at all times, taking up any slack and preventing the cable from becoming tangled or kinked. A further advantage of locking the slide is that it permits the operator to feed the work into the saw with the saw assembly and carriage being stationary as they are urged to the rear by the spring 21.

The rear end of the cable 53 is fast to the drum 50 and its intermediate reaches are guided by a sheave 57 on the frame near the cutting point of the band saw blade 58 and by a sheave 59 in a yoke 60 which is pivoted to a transfer lever or arm 61, itself pivoted as at 62 to the rear face of the main plate 47 of the saw assembly.

At its outer end the transfer arm engages bar 27 at the free end of the latter, that is near the end distant from the loose pin pivot 26 of the bar on the platform 25. This outer end of the transfer arm 61 is therefore constantly urged downward by the control spring 29, pulling downwardly the sheave 59 and raising the much shorter left portion of this centrally pivoted lever or transfer arm 61. The inner end 63 of the transfer arm is joined by a loosely pivoted connecting rod 65 to a right angular rocking lever 66 extending freely through the main plate 47 with its vertical arm 67 pressing against the smaller flange 51 of the drum, this rocking lever 66 having an opening 68 through which the lower band saw wheel shaft 45 freely passes. As a result of this construction, movement of the transfer arm or lever about its pivot 62 governs the amount of pressure of the larger or clutch flange 52 of the drum against the band wheel. When the platform 25 is depressed, the bar 27 moves downward with it, provided the tension on the spring is set to be great enough to overcome the resistance of the transfer lever 61. The maximum feed power is governed by the compression of control spring 29.

As previously stated, the angle iron rail or parallel bar 33 is constantly maintained horizontal by links 35 and 34. The latter is a portion of foot lever 69 carrying a pedal 70 at its lower end and in front of the frame. A centrally located spring 71 (Fig. 3) raises bar 33 above its base bar 72, which is a part of channel 16, as far as permitted by a link or stop member 73 passing loosely through bracket 74 on leg 14 of the frame of the machine.

To relieve the operator of constantly pressing down foot pedal 70 when the work offers substantially constant resistance, a toothed bar or rack 75 is pivotally connected as at 76 to the foot lever 69 and is received loosely in a bracket 77 having a beveled edge or ratchet tooth to engage the teeth on rack 75 to hold the foot pedal to apply any desired pressure on roller 32, carried by the outside downturned flange of the platform 25, and consequently on the outer end of the transfer arm 61.

When the carriage reaches the end of its forward or working travel an adjustable screw pin 79 at its front end strikes the switch operator 80, this in turn strikes the upper end 81 of toothed bar or rack 75, rocking the latter forward and thus disengaging its teeth from bracket 77 so that the foot pedal 70 is free to move upward. The centrally located spring 71 now raises horizontal angle iron 33 to neutral position thus stopping the feeding operation as the lower horizontal arm of the rocking lever 66 is pulled down to rock the flange engaging upper vertical arm of this rocking lever away from the drum, releasing the clutching engagement between the drum and the band wheel which drives the band saw blade.

The switch operator 80 acts upon an electric push-pull switch (not shown) turning the current to the motor on or off. As the switch operator may be moved without striking the toothed bar or rack 75, when the latter is not in engagement with the holding ratchet tooth of the bracket, the power to the motor may be on when the feed is controlled by the foot lever but when the automatic feed is being used, the completion of the full forward travel of the carriage will always turn off the power when the feed is disengaged by the upward movement of the parallel bar 33.

The operation is as follows: When not in use the saw carriage is pulled to its rearward position by spring 21. Should it be desired to alter the point from which the saw moves forward, the heavy gravity controlled member 54 to which the forward end of the cable is fastened, instead of moving freely on its vertical guide or track 55, is locked to it at a chosen elevation. When the band wheel is rotated to drive the saw blade, the drum 50 rotates with it, winding up the cable and pulling the carriage forward in its cutting stroke provided the foot pedal is depressed. If the pedal is not so pushed down the carriage does not move as there is no clutching contact between the drum and the lower or driving band wheel. The harder the pressure on the foot pedal 70, the faster the feed, there being then no slippage of the clutch. This is excellent for light work. When the resistance of the work increases, the adjusting spring 29 is compressed and the slippage of the clutch is increased so that the carriage and the saw move toward the operator as fast as the work permits, the rate of travel being very slow with heavy work even though the foot pedal is as far down as possible, held either by the foot or by the automatic feed rack.

When the saw blade encounters a greater resistance a heavier pull is given the cable, which accordingly tends to raise the sheave pulley 59 and its yoke carried by the transfer lever 61, so the latter tilts about its pivot 62 if the pressure is great enough to further compress the control spring 29. This pivoting of the transfer lever, through the connecting rod 65 and the rocking lever 66 releases some of the clutching friction between the drum and the band wheel and this in turn permits further slippage until the excess strain on the cable is relieved. When the resistance to the cutting of the work is lessened, the control spring reseats the rail or bar 27 and the normal rate of feeding the saw assembly forward is resumed.

What I claim is:

1. In a band saw machine, a horizontally reciprocating carriage, a saw frame mounted on the carriage, a pair of band wheels on said saw frame, a band saw blade on the wheels, a drum movable with the saw frame and coaxial with and frictionally engaging one of the band wheels, cable means connected at one end to said drum, means for driving the wheels and said drum, means for anchoring the free end of the cable to a fixed point to limit the rearward non-working movement of the carriage, and spring means for holding the carriage and the saw frame at said limit of movement, whereby work may be fed to the saw blade.

2. In a cable feed for a carriage, a frame including a rail, a parallel bar connected to the rail for movement toward and away from the rail while constantly parallel therewith, a carriage reciprocatingly mounted in the frame on a track parallel to the rail and the bar, a shaft mounted to move with the carriage, a driven member on said shaft, a drum loosely mounted on the shaft and having a friction face for clutch engagement with said driven member, a cable fast to the drum at one end and to the frame at the other end whereby the winding of the cable on the drum moves the carriage, a lever for moving the parallel bar toward and away from the rail, and means engaging the parallel bar for increasing and decreasing the clutching engagement of the drum and the driven member according as the parallel bar is lowered or raised.

3. The feed of claim 2 in which said means includes a transfer arm pivoted to the frame and a sheave carried by the transfer arm to the side of the pivot thereof away from the drum and engaging an intermediate portion of the cable, whereby resistance to movement of the carriage will create an increased pull on the cable and cause the sheave to move the transfer arm about its pivot.

4. The feed of claim 3 in which the rocking of the transfer arm by the increased pull on the cable will decrease the clutching engagement.

5. The feed of claim 2 in which the means includes a platform movable with the carriage and carrying a roller constantly engaging the parallel bar as the carriage moves along the frame.

6. The feed of claim 5 in which the platform is carried by a pivot movable with the carriage, a spring-pressed bar is pivoted to the platform, and a pivoted lever engaging said bar and movable thereby controls the degree of clutch pressure.

7. The feed of claim 2 in which the means includes a transfer arm pivoted to the frame proximate the drum, a sheave is carried by the transfer arm to one side of the pivot thereof and engaging an intermediate portion of the cable and a platform movable with the carriage carries a roller constantly engaging the parallel bar as the carriage moves along the frame.

8. The feed of claim 7 in which the transfer arm operates a rocking lever directly engaging a side face of the drum to govern the amount of clutch pressure.

9. In a cable feed for a carriage, a frame including a rail, a parallel bar connected to the rail for movement toward and away from the rail while constantly parallel thereto, a carriage reciprocatingly mounted in the frame on a track parallel to the bar and the rail, a shaft mounted to move with the carriage, a driven member on said shaft, a drum loosely mounted on the shaft and having a friction face for clutch engagement with the driven member, a cable secured to the drum at one end and to the frame at the other end, means for moving the parallel bar, a transfer lever rockable about a pivot parallel to the shaft, means at one end of the transfer lever for pressing the drum against the driven member, a sheave carried by the transfer lever on the other side of the transfer lever pivot for engaging an intermediate portion of the cable, and spring-pressed means for moving the sheave end of the transfer lever as the parallel bar is moved up and down to alter the clutch pressure.

10. The cable feed of claim 9 in which the spring-pressed means includes a platform pivoted to move with the carriage and carrying a roller engaging the parallel bar, a bar pivoted to the platform and overlying one end of the transfer lever, and spring means pressing the bar against the lever, the proximate pivots of the bar and of the platform being distant from the spring means, whereby downward movement of the parallel bar will depress the sheave end of the transfer lever and a pull on the cable will rock the transfer lever in the opposite direction.

11. In a band saw machine of the type having a reciprocating carriage carrying a driven band wheel, a second band wheel, and a band saw mounted on the two band wheels; a drum with a peripheral flange at one end, the other end having a friction face coaxial with and contacting the driven band wheel; a rocking lever yieldingly engaging the drum flange on said one end and farther from the driven wheel, a pivoted transfer lever having unequal arms, means operatively connecting the shorter arm of the transfer lever to the rocking lever, a pulley carried by the longer arm of the transfer lever, a cable on the drum and anchored on the band saw machine frame and manually controlled means for pressing the longer arm of the transfer lever to release friction between the lower driven band wheel and the drum.

12. The machine of claim 11 in which the friction face of the drum is a peripheral flange of greater diameter than the peripheral flange at the said one end.

13. In a band saw machine, a horizontally reciprocating carriage, a saw frame mounted on the carriage, a pair of band wheels on said saw frame, a band saw blade on the wheels, a drum movable with the saw frame and coaxial with and frictionally engaging one of the band wheels, cable means connected at one end to said drum, means for driving the wheels and thereby frictionally driving said drum, means for anchoring the free end of the cable to a fixed point, means including a spring controlled pulley engaging the cable to hold the cable taut, and manually controlled means including said pulley to increase or decrease the frictional engagement of the drum and band wheel whereby when the manually controlled means is moved to increase said engagement, the cable will be wound on the drum thereby pulling the carriage at an increasing rate with light resistance to movement of the saw blade, but when the resistance to movement of the saw blade increases, the pull on the cable increases and the pulley is moved to compress the spring which action releases the clutching friction between the drum and the band wheel, permitting further slippage until the excess strain on the cable is released.

References Cited in the file of this patent

UNITED STATES PATENTS

| | | |
|---|---|---|
| 368,268 | Adam | Aug. 16, 1887 |
| 1,001,272 | Howard | Aug. 22, 1911 |
| 1,181,402 | Mershon | May 2, 1916 |
| 1,484,061 | Cleland | Feb. 19, 1924 |
| 1,499,756 | Street | July 1, 1924 |
| 1,624,064 | O'Neill | Apr. 12, 1927 |
| 1,813,291 | Herbold | July 7, 1931 |
| 2,078,893 | Price et al. | Apr. 27, 1937 |
| 2,427,038 | Ashman | Sept. 9, 1947 |

FOREIGN PATENTS

| | | |
|---|---|---|
| 617,990 | France | Nov. 30, 1926 |